US011574564B2

(12) United States Patent
Pulos et al.

(10) Patent No.: US 11,574,564 B2
(45) Date of Patent: Feb. 7, 2023

(54) ADHESIVE-BACKED WALL, FLOOR, AND WINDOW GRAPHICS AND INSTALLATION METHOD

(71) Applicant: Franke Technology and Trademark Ltd., Hergiswil (CH)

(72) Inventors: Dan C. Pulos, San Clemente, CA (US); Philip J. Garcia, Sr., Santa Clarita, CA (US); Brandon Craig Ledford, Oak Park, CA (US); Bielman Moreno, Winnetka, CA (US)

(73) Assignee: Franke Technology and Trademark Ltd., Hergiswil (CH)

( * ) Notice: Subject to any disclaimer, the term of this patent is extended or adjusted under 35 U.S.C. 154(b) by 111 days.

(21) Appl. No.: 17/018,082

(22) Filed: Sep. 11, 2020

(65) Prior Publication Data

US 2021/0082323 A1 Mar. 18, 2021

Related U.S. Application Data

(60) Provisional application No. 62/981,109, filed on Feb. 25, 2020, provisional application No. 62/900,968, filed on Sep. 16, 2019.

(51) Int. Cl.
| | |
|---|---|
| *G09F 15/02* | (2006.01) |
| *B32B 27/06* | (2006.01) |
| *G09F 19/22* | (2006.01) |
| *B32B 5/02* | (2006.01) |

(52) U.S. Cl.
CPC ............. *G09F 15/02* (2013.01); *B32B 5/028* (2013.01); *B32B 27/06* (2013.01); *G09F 19/22* (2013.01); *B32B 2519/00* (2013.01)

(58) Field of Classification Search
CPC ..... B32B 2519/00; B32B 27/06; B32B 5/028; G09F 19/22; G09F 15/02
See application file for complete search history.

(56) References Cited

U.S. PATENT DOCUMENTS

2009/0032180 A1* 2/2009 O'Connor ................. B26F 3/16
428/41.8

* cited by examiner

*Primary Examiner* — Vishal I Patel
(74) *Attorney, Agent, or Firm* — Volpe Koenig

(57) ABSTRACT

An adhesive-backed floor, wall, or window graphic adapted for installation on a floor, wall, or window, is provided that includes a printed flexible substrate, an adhesive located on a back of the printed flexible substrate, and a back liner system. The back liner system, at least for the adhesive-backed wall and window graphic, includes removable liner dots in at least two upper corners of the adhesive-backed window graphic and in a medial location of the adhesive-backed window graphic, a center removable liner strip that is oriented vertically in an installation orientation of the adhesive-backed window graphic, and a plurality of side removable liner strips located on both sides of the center removable liner strip. An installation method using the adhesive-backed floor, wall, or window graphic is also provided that provides for easier installation with professional results.

12 Claims, 7 Drawing Sheets

ADHESIVE-BACKED WALL, FLOOR, AND WINDOW GRAPHICS AND INSTALLATION METHOD

INCORPORATION BY REFERENCE

The following documents are incorporated herein by reference as if fully set forth: U.S. Provisional Patent Application No. 62/981,109, filed Feb. 25, 2020, and U.S. Provisional Patent Application No. 62/900,968, filed Sep. 16, 2019.

BACKGROUND

Large format wall, floor, and window decals or adhesive-backed wall, floor, and window graphics are known. These are typically printed on an adhesive-backed polymeric material and installed respectively on a wall, floor, or window in, for example, a restaurant or store, in order to provide advertising or visual or promotional materials that can be easily seen by consumers.

Known adhesive-backed wall, floor, or window graphics or decals having a large format, i.e. greater than 2 square feet, are typically installed by professional installers in order to avoid bubbles, wrinkles, and/or poor alignment. Installation typically involves applying an application liquid to the wall, floor, or window surface, removing either one or two pieces of a liner material from the adhesive backing, and "floating" the large format wall, floor, or window graphic or decal into the desired positon on the application liquid prior to squeegeeing the liquid from behind the decal such that the adhesive can contact the wall, floor, or window surface in order to adhere the adhesive-backed wall, floor, or window graphic or decal in position. Often, the cost for installation is more than the cost of the large format adhesive-backed wall, floor, or window graphic or decal itself.

These known adhesive-backed wall, floor, or window graphics and decals are typically printed on a polymeric material, such as vinyl, typically having a thickness of less than four mils, typically in the range of 2-3 mils.

It would be desirable to provide an adhesive-backed wall, floor, or window graphic or decal system that can be easily installed by any user following simple instructions in order to achieve professional results without the high costs typically involved.

SUMMARY

In one aspect, an adhesive-backed wall or window graphic that is adapted for installation on a wall or window is provided. The adhesive-backed wall or window graphic (also referred to as a decal) is typically a large-format (more than two square feet) and includes a printed flexible substrate as well as an adhesive located on the back of the printed flexible substrate. A back liner system is provided. The back liner system includes removable liner dots at least in two upper corners of the adhesive-backed wall or window graphic as well as in a medial location of the adhesive-backed wall or window graphic. A center removable liner strip that is oriented vertically in an installation orientation of the adhesive-backed wall or window graphic is also provided. A plurality of side removable liner strips are located on both sides of the center removable liner strip. Preferably, indicia are provided on the removable liner dots, the center removable liner strip, as well as the plurality of side removable liner strips that indicate an order for removal.

Preferably, the adhesive-backed wall or window graphic can then be easily installed by any user by the user peeling off the removable liner dots to expose adhesive positioning dots of the adhesive. The adhesive-backed wall or window graphic is then positioned on the wall or window and adhered in place using the adhesive positioning dots. Here, re-positioning of the adhesive-backed wall or window graphic can be done by pulling the adhesive positioning dots out of contact with the wall or window and re-adhering the adhesive positioning dots to the wall or window in an adjusted position in order to properly align the adhesive-backed wall or window graphic. The small area of these removable liner dots that only exposes a relatively small adhesive positioning dot of the adhesive allows for easy and professional looking re-positioning without damaging the adhesive-backed wall or window graphic. Once the proper position has been established, one of the left or right side of the adhesive-backed wall or window graphic is pulled back from the wall or window by pulling the adhesive-backed wall or window graphic on the one of the left or right side out of contact with the wall or window and bending the one of the left or right side of the adhesive-backed wall or window graphic away from the wall or window to access the center removable liner strip. Here, the adhesive positioning dots in the medial location(s) as well as on the opposite upper corner hold and maintain the position of the adhesive-backed window graphic or decal.

The user then removes the center removable liner strip to expose a center strip of the adhesive. This center strip of the adhesive is then applied to the wall or window and the adhesive-backed window graphic is preferably squeegeed to the window in the area of the center strip of the adhesive. Squeegeeing is preferably accomplished with a felt squeegee which provides more give and is easier for the average user to achieve good results in removing air bubbles and any wrinkles. To the extent that the center removable liner strip is narrow, this allows for easier installation by the user and, in the event that there is a wrinkle or air bubble that cannot be removed using the squeegee, it is easy to pull back only this very limited exposed center strip of the adhesive from the wall or window prior to re-applying it. Once the center strip of adhesive has been applied to the wall or window and squeegeed in position, an adjacent side removable liner strip adjacent to the center strip of the adhesive on the one of the left or right side of the adhesive-backed wall or window graphic is removed to expose an adjacent strip of the adhesive. This is then squeegeed against the wall or window to connect this further portion of the adhesive-backed window graphic to the wall or the window. A next adjacent one of the side removable liner strips is then removed on the one of the left to right side of the adhesive backed wall or window graphic to expose a next adjacent strip of the adhesive, and this next area of the adhesive-backed wall or window graphic is then squeegeed to the wall or window. These steps are repeated until all of the side removable liner strips on the one of the left or the right side of the adhesive-backed wall or window graphic are removed until that side of the adhesive-backed wall or window graphic is completely installed on the wall or window.

The other of the one of the left or right side of the adhesive-backed wall or window graphic is then bent back away from the wall or window to access the side removable liner strips on the other side, and these steps are then repeated starting with the adjacent removable liner strip that is adjacent to the center strip of the adhesive, with successive ones of the adjacent strips being removed and the adhesive-backed wall or window graphic squeegeed in the area of the removed liner strip to the wall or window in order to remove any wrinkles or air bubbles in a step-wise manner until the complete adhesive-backed wall or window graphic is installed on the wall or window.

Preferably, the removable liner dots, the center removable liner strip, and the plurality of the side removable liner strips include indicia indicating an order for removal and optionally further instructions. For example, the removable liner dots may be numbered as 1, the center removable liner strip may be numbered as 2, and the plurality of side removable liner strips are numbered in sequential order progressing away from the center toward the edge on one side, for example, the left side, and further sequential numbering of the side removable liner strips starting from the center and progressing toward the opposite edge, for example, the right side, completes the indicia.

The flexible substrate may be made of a solid sheet and is preferably a polymeric material, such as vinyl, that is adapted to be printed on in order to form the graphic component of the adhesive-backed wall or window graphic or decal. The inventors have also found that the thickness of the printed flexible substrate must be greater than 4 mils, and preferably is in the range of 4-25 mils, more preferably in the range of 6-15 mils, and most preferably in the range of 7.5-9 mils in thickness. To the extent that the printed flexible substrate is a solid sheet, it is also possible to add an optional laminate on a front surface of the printed flexible substrate in order to increase the overall thickness. For the solid sheet substrate, preferably the adhesive includes air escape paths defined therein. These can be provided by applying the adhesive as a matrix of dots that includes air channels therebetween or by the adhesive being applied with channels that allow for air escape. This type of structured adhesive application is known by those skilled in the art.

It is also possible for the printed flexible substrate to be provided as a mesh. Preferably, the mesh is also made of a polymeric material, such as vinyl. Preferably, the mesh has a thickness of 4-25 mils, more preferably in the range of 6-15 mils and most preferably in the range of 7.5-9 mils.

In one aspect, additional removable liner dots are also located in the lower two corners of the adhesive-backed wall or window graphic in order to allow for enhanced holding the adhesive-backed wall or window graphic in an initial position in order to allow for adjustment. The removable liner dots preferably are circular and have a diameter of 1-3 inches. However, other shapes and sizes could be used for the removable liner dots. Additionally, the number and location of these removable liner dots can be adjusted for larger scale adhesive-backed wall or window graphics or decals as well as for irregular shapes in order to allow for easier positioning and adjustment prior to having a large area of the adhesive on the back of the printed flexible substrate exposed.

With respect to the adhesive-backed floor graphic, this is similar to the adhesive-backed floor or window graphic, except that the liner dots are not required since the adhesive-backed floor graphic is positioned on the floor and there is no need to hold the sides up against a vertical surface. A back liner system is provided that is similar to that described above. The back liner system includes a center removable liner strip and a plurality of side removable liner strips that are located on both sides of the center removable liner strip. Preferably, indicia are provided on the center removable liner strip as well as the plurality of side removable liner strips that indicate an order for removal.

Preferably, the adhesive-backed floor graphic can then be easily installed by any user by positioning the adhesive-backed floor graphic on the floor, and then folding back one side to peel off the center removable liner strip. The adhesive-backed floor graphic is spread back out to re-check the position, and if any adjustment is required, the graphic can be peeled up since the small area of the center removable liner strip only exposes a relatively small adhesive area to allow for easy and removal and re-positioning without damaging the adhesive-backed floor graphic. Once the proper position has been established and the center adhesive strip is adhered, one of the left or right side of the adhesive-backed floor graphic is folded back from the floor by bending the one of the left or right side of the adhesive-backed floor graphic away from the floor.

The user then removes an adjacent side removable liner strip adjacent to the center strip of the adhesive on the one of the left or right side of the adhesive-backed floor graphic is removed to expose an adjacent strip of the adhesive. This is then applied against the floor to connect this further portion of the adhesive-backed floor graphic to the floor. A next adjacent one of the side removable liner strips is then removed on the one of the left to right side of the adhesive backed floor graphic to expose a next adjacent strip of the adhesive, and this next area of the adhesive-backed floor graphic is then applied to the floor. These steps are repeated until all of the side removable liner strips on the one of the left or the right side of the adhesive-backed floor graphic are removed until that side of the adhesive-backed floor graphic is completely installed.

The other of the one of the left or right side of the adhesive-backed floor graphic is then bent back away from the wall or window to access the side removable liner strips on the other side and these steps are then repeated starting with the adjacent removable liner strip that is adjacent to the center strip of the adhesive, with successive ones of the adjacent strips being removed and the adhesive-backed floor graphic applied in the area of the removed liner strip to the floor in step-wise order in order to allow the removal of any wrinkles or air bubbles until the complete adhesive-backed floor graphic is installed.

The flexible substrate is preferably made of a solid sheet and is preferably a polymeric material, such as vinyl, that is adapted to be printed on in order to form the graphic component of the adhesive-backed floor graphic or decal. The inventors have also found that the thickness of the printed flexible substrate must be greater than 4 mils, and preferably is in the range of 4-25 mils in thickness. To the extent that the printed flexible substrate is a solid sheet, it is also possible to add an optional laminate on a front surface of the printed flexible substrate in order to increase the overall thickness. The adhesive system is preferably as discussed above in order to allow air escape channels so that air bubbles are not trapped during installation. The inventors have found that using this system, it is not even necessary to squeegee the adhesive-backed floor graphic or decal in place, and it can be smoothed into position in step-wise fashion by hand. Of course, a squeegee can be used in the application, if desired.

Further aspects of the invention are described below and in the claims.

BRIEF DESCRIPTION OF THE DRAWINGS

The foregoing summary, as well as the following detailed description of the preferred embodiments of the invention will be better understood when read in conjunction with the appended drawings. For the purpose of illustrating the invention, there is shown in the drawings embodiments which are presently preferred. It should be understood, however, that the invention is not limited to the precise arrangement shown.

DETAILED DESCRIPTION

Figure 1:
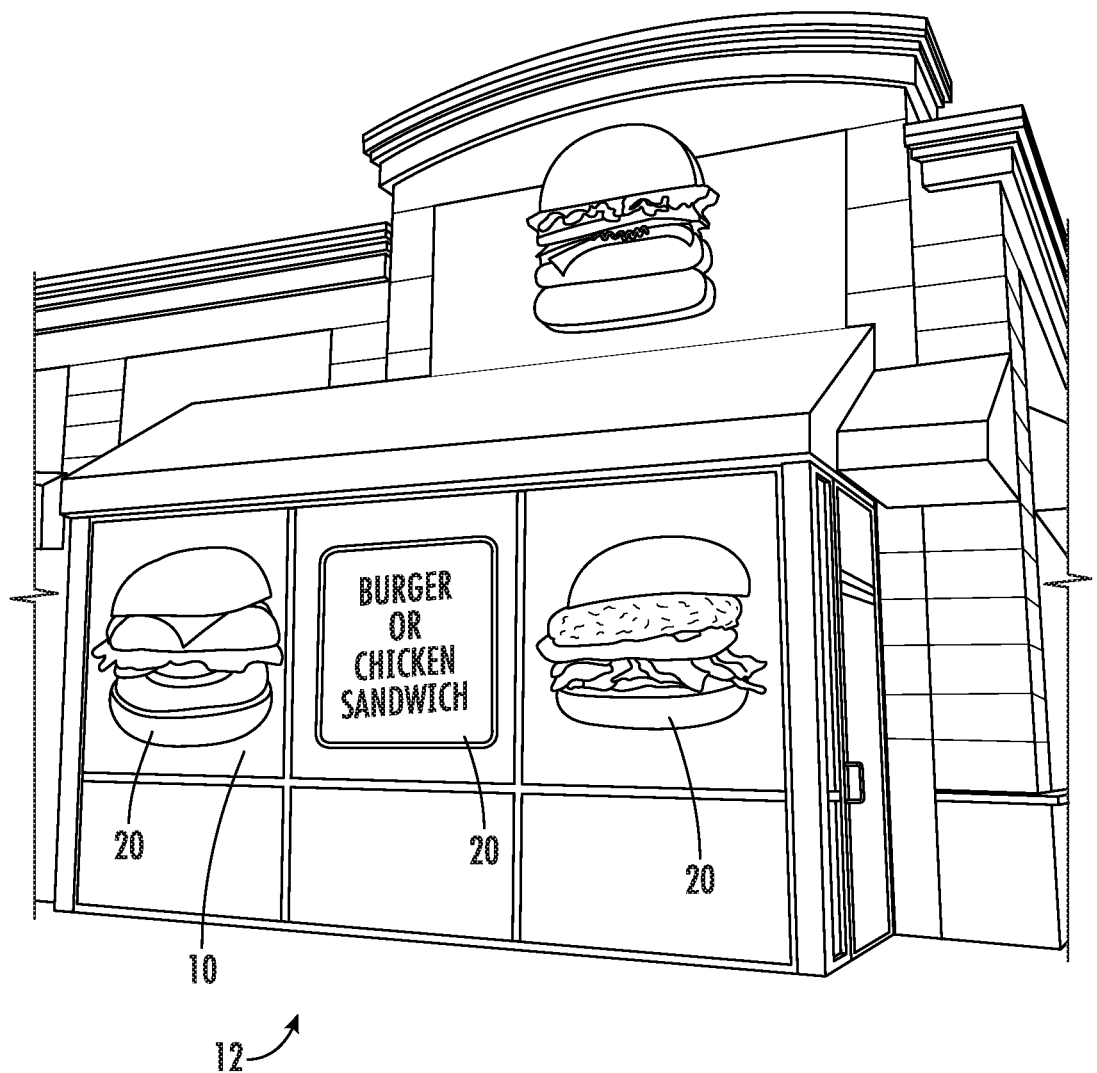
FIG. 1 is a view of a store front with adhesive-backed window graphics installed on the window.

For purposes of this detailed description, words such as "front", "back", "top", "bottom", "left", and "right" designate directions in the drawings, and are used for convenience in referring to the designated parts or areas. The use of the terminology "at least one of" followed by a list of elements, such as "A, B, or C", means A, B, or C individually or various combinations thereof. The terms "generally" and "about" when used in connection with a number or numerical range mean within +/−10% unless otherwise noted, and when used in connection with a shape, such as "generally circular", include variations that fall within +/−10% of the exact shape indicated. The terms "graphic" and "decal" are used interchangeably herein.

Referring to FIG. 1, an adhesive-backed wall or window graphic 20 (also referred to as a decal) is shown that is installed on a window 10. In FIG. 1, three separate adhesive-backed window graphics 20 are illustrated installed on the window 10 of a storefront 12. The adhesive-backed wall or window graphic 20 could also be installed on a wall.

Referring to FIGS. 2-6, the adhesive-backed wall or window graphic 20 is formed from a printed flexible substrate 22 that includes a front 30 and a back 32. The printed flexible substrate 22 is preferably made of a polymeric material, and more preferably is made of vinyl. In the embodiment shown in FIG. 5, the printed flexible substrate 22 is a solid sheet 24 which has graphics printed thereon. Optionally, a laminate 26 can be located on top of the solid sheet 24. The overall thickness of the substrate 22 is preferably in the range of 4-25 mils, more preferably in the range of 6-15 mils. In the preferred embodiments, a thickness in the range of 7.5-9 mils has been found to have the desired flexural properties for ease of installation.

Figure 6:
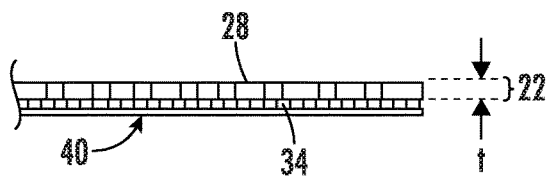
FIG. 6 is a cross-sectional view of another embodiment of the adhesive-backed window graphic in which the printed flexible substrate is a mesh.
Figure 7:
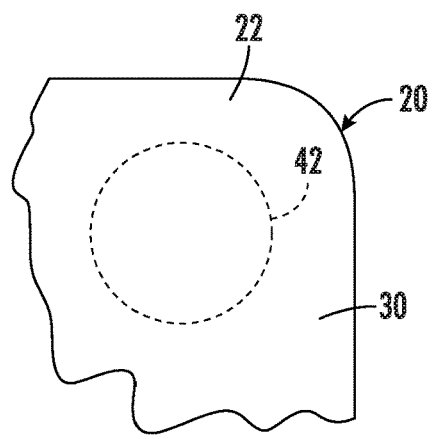
FIG. 7 is a partial front view showing a portion of the adhesive-backed window graphic of FIG. 5 in which the printed flexible substrate is a solid sheet.
Figure 8:
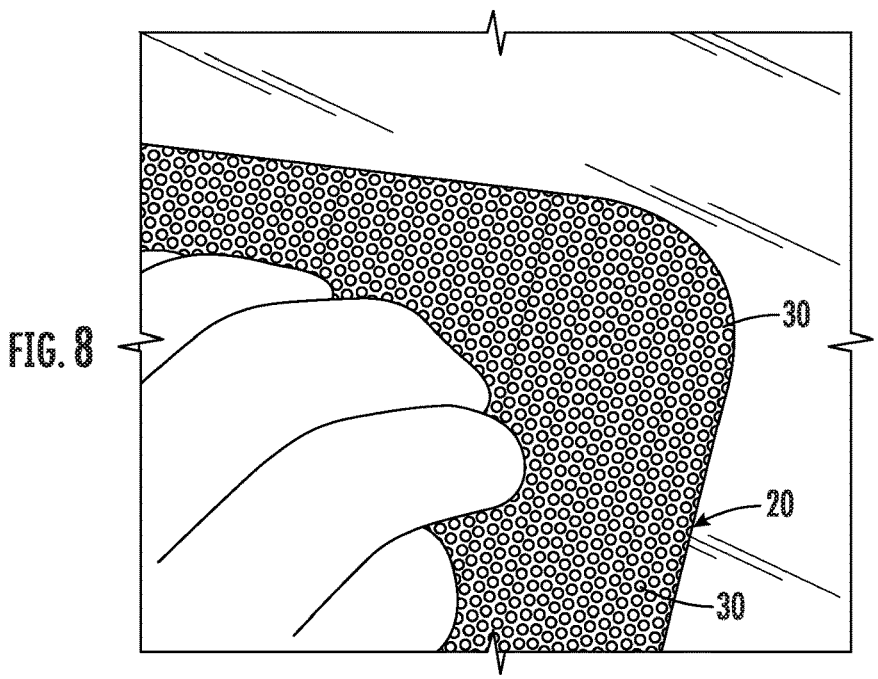
FIG. 8 is a partial front view of a portion of the adhesive-backed window graphic of FIG. 6 in which the printed flexible substrate is a mesh.

Alternatively, as shown in FIG. 6, the printed flexible substrate 22 can be formed of a mesh material 28. This is particularly useful for window installations. The mesh material 28 is preferably also a polymeric material, and more preferably vinyl. The graphic is printed thereon. Preferably, the mesh material 28 also has a thickness of 4-25 mils, and more preferably from 6-15 mils. Most preferably the thickness is from 7.5-9 mils.

Figure 4:
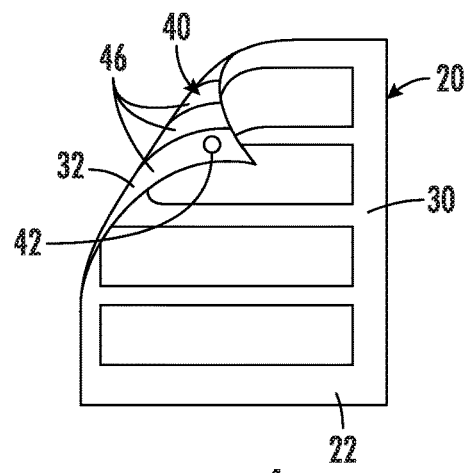
FIG. 4 is a view showing the adhesive-backed window graphic of FIGS. 2 and 3 shown partially bent forward so that the front and back surfaces are both visible.
Figure 5:
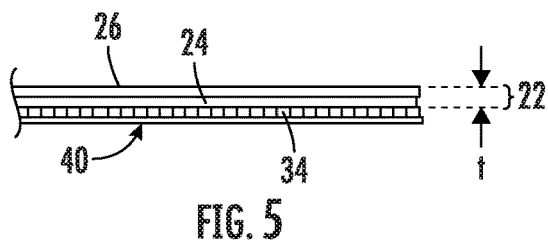
FIG. 5 is a cross-sectional view showing a first construction of the adhesive-backed window graphic in which the printed flexible substrate is a solid sheet.

Still referring to FIGS. 4, 5, and 6, an adhesive 34 is located on the back of the printed flexible substrate 22. The adhesive 34 preferably includes air escape paths defined therein which can be provided in a known manner, such as providing the adhesive as a matrix of dots with air escape paths therebetween or by providing channels through the adhesive. Adhesives and their application in this manner on adhesive-backed wall or window graphics are known to those skilled in the art and accordingly are not described in further detail here.

Figure 3:
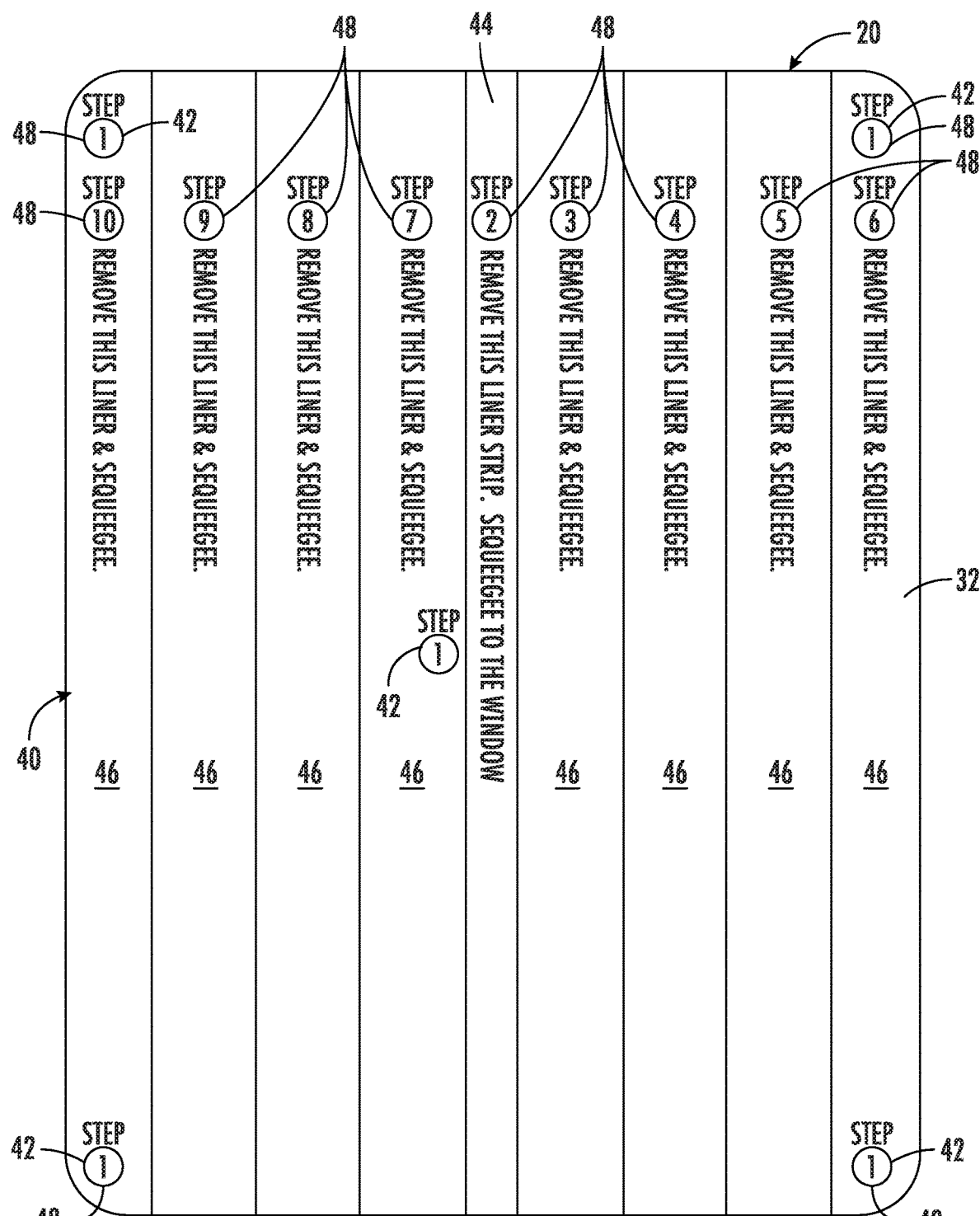
FIG. 3 is a rear view of the adhesive-backed wall or window graphic shown in FIG. 2.

Referring to FIGS. 3-6, a back liner system 40 is placed on the adhesive 34 that is adapted to be removed in order to install the adhesive-backed wall or window graphic 20 on a wall or on the window 10, as shown. The liner system 40 includes removable liner dots 42 at least in two upper corners of the adhesive-backed wall or window graphic 20 as well as in a medial location of the adhesive-backed wall or window graphic 20. As shown in FIG. 3, the removable liner dots 42 that is in the medial location of the adhesive-backed wall or window graphic 20 is offset from a center area for reasons explained in further detail below. Additionally, removable liner dots 42 can be located in the lower two corners of the adhesive backed wall or window graphic 20. Depending upon the shape of the adhesive-backed wall or window graphic 20, the removable liner dots 42 can be located in other areas in order to carry out the function of allowing removable positioning of the adhesive-backed wall or window graphic 20 on a wall or window prior to complete installation.

A center removable liner strip 44 that is oriented vertically in an installation orientation of the adhesive-backed wall or window graphic 20 is also provided. This does not need to be exactly centered and can vary in position from side to side by up to 25% of a width of the adhesive-backed wall or window graphic 20 and still be considered centered in accordance with the present invention. Preferably, the center removable liner strip has a width of no more than 2.5 inches and more preferably between 1 and 2 inches.

A plurality of side removable liner strips 46 are located on both sides of the center removable liner strip 44 as shown in detail in FIG. 3. The side removable liner strips 46 are also preferably oriented generally vertically and are parallel to one another. As shown in detail in FIG. 3, the removable liner dots 42, the center removable liner strip 44, and the plurality of side removable liner strips 46 preferably include indicia 48 indicating an order for removal. This can be numbers corresponding to the number removal steps as shown in FIG. 3, letters, or other indicia providing instructions on an order for removal, preferably in sequential order as shown. However, it is also possible for the instructions to provide for the initial removal of the liner dots 42 followed by the center removable liner strip 44, followed by the removal, in alternating sequence from side to side on both sides center of the plurality of side removable liner strips.

This structuring of the removable liner system 40 with the removable liner dots 42, the center removable liner strip 44, and the plurality of side removable liner strips 46 allows for easier installation of the adhesive-backed wall or window graphic by the user without the requirement of having a professional installer typically needed for large format adhesive-backed wall or window graphics known in the art.

Figure 9A:
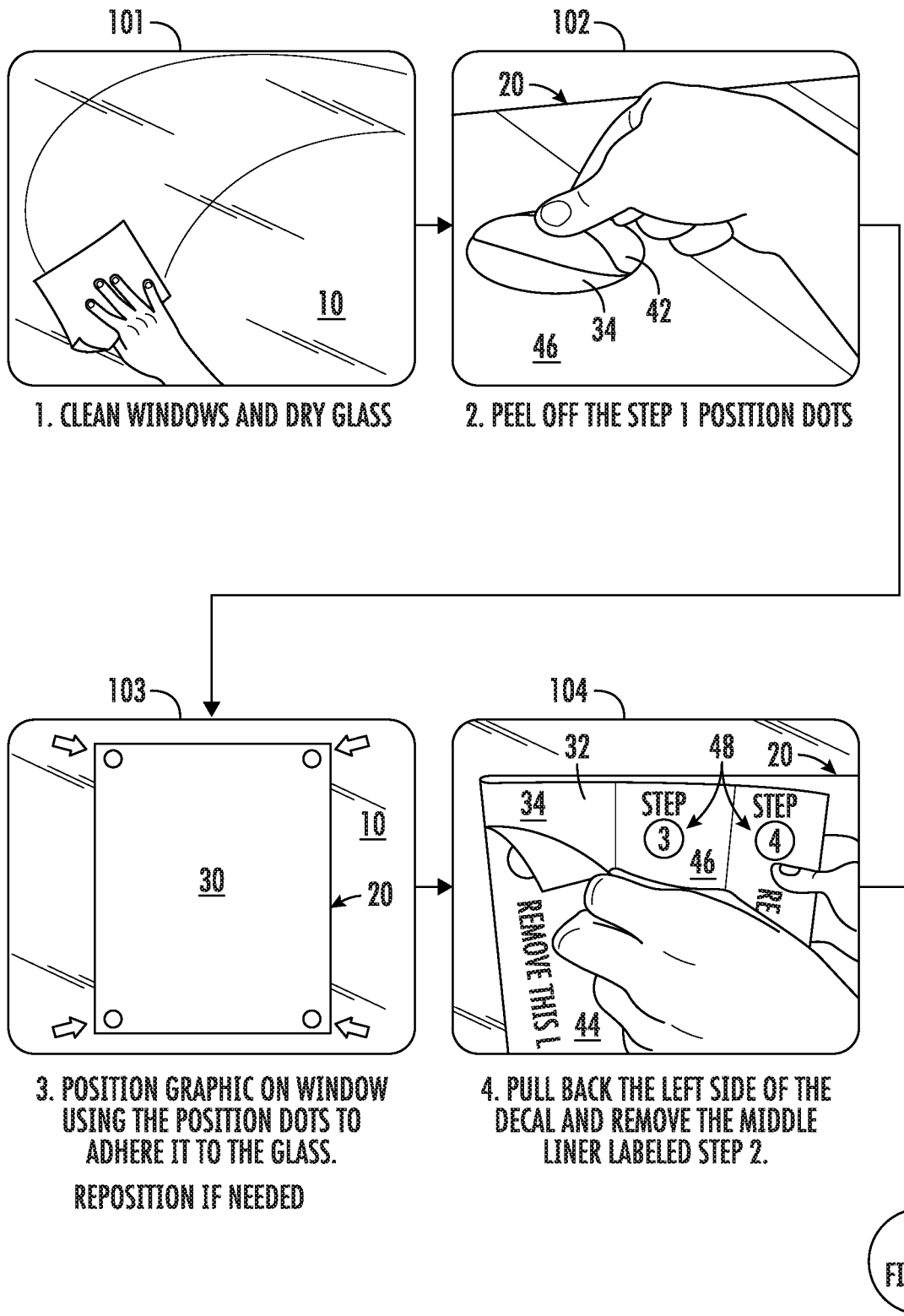
FIGS. 9A and 9B are a flowchart showing a method for installing the adhesive-backed window graphic shown in FIGS. 1-8.
Figure 9B:
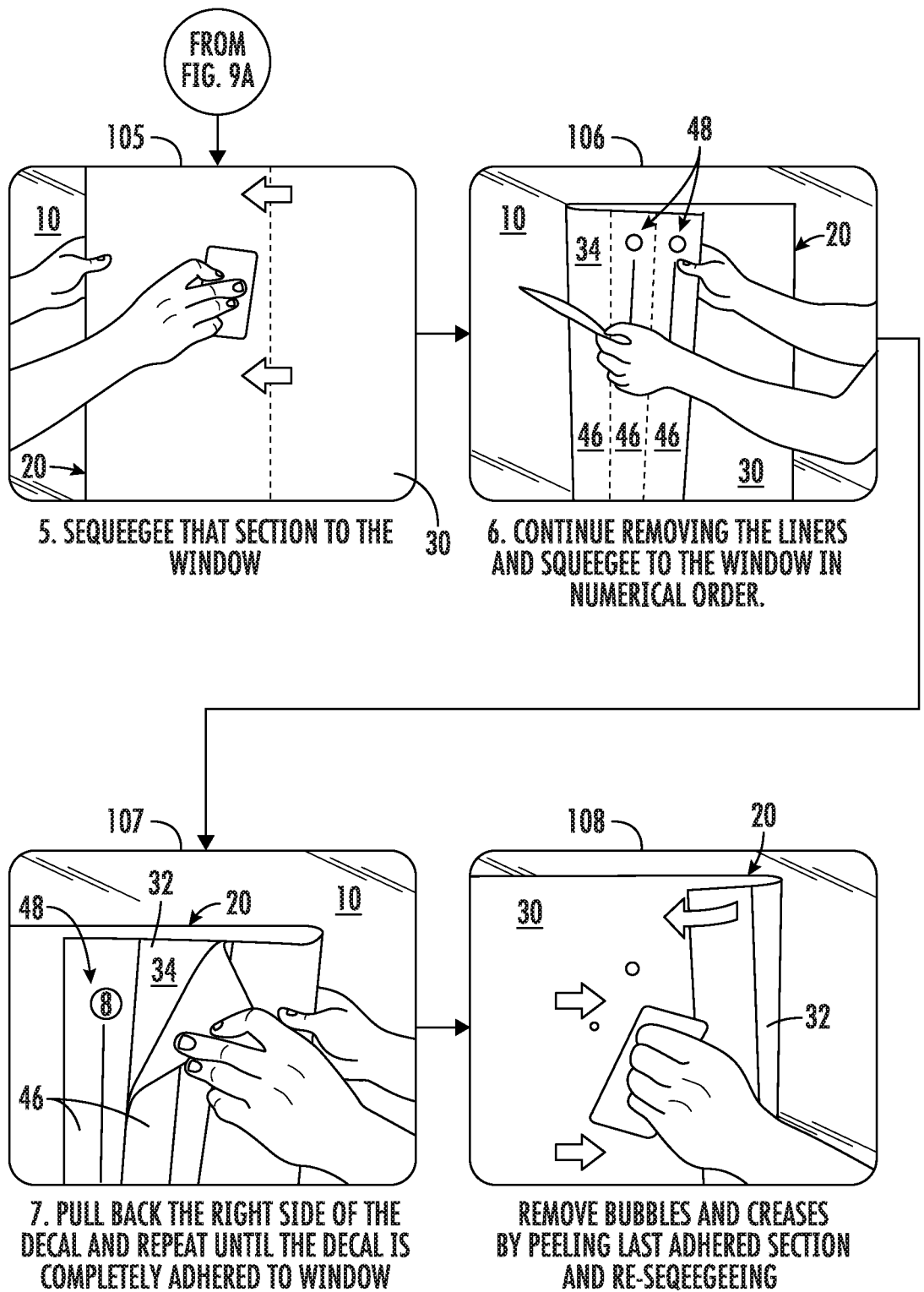

Referring now to FIGS. 9A and 9B, a flowchart showing one preferred installation method is provided. Here, in step 101, the window 10 or wall is thoroughly cleaned and dried prior to installing the adhesive-backed wall or window graphic 20 on the window 10 (as shown) or a wall.

As shown in step 102, initially the removable liner dots are peeled off to expose adhesive positioning dots of the adhesive on the back 32 of the printed flexible substrate 22. The adhesive-backed wall or window graphic 20 is then positioned on the window 10 (or wall) and adhered to the window 10 (or wall) using the adhesive positioning dots exposed by removal of the removable liner dots 42. The installer can then inspect the position of the adhesive-backed wall or window graphic 20 and, if necessary, reposition the adhesive-backed wall or window graphic 20 by pulling the adhesive positioning dots exposed by a removal of the removable liner dots 42 out of contact with the wall or window and re-adhering the adhesive positioning dots to the wall or window 10 in an adjusted position. This is shown at step 103 in FIG. 9A.

Once the positioning of the adhesive-backed wall or window graphic 20 is satisfactory, the installer pulls back one of the left or right side of the adhesive-backed wall or window graphic 20 from the wall or window by pulling the adhesive positioning dot exposed by removal of the removable liner dot 42 on one of the left or the right side out of contact with the wall or window and bending the one of the left or side of the adhesive-backed wall or window graphic 20 away from the wall or window 10 to access the center removable liner strip 44.

Step 104 in FIG. 9A shows the left side being bent and pulled back after the adhesive positioning dot exposed by removal of the removable liner dot 42 is pulled out of contact with the wall or window 10, and the center removable liner strip 44 being removed to expose a center strip of the adhesive 34. The center strip of the adhesive is then applied to the wall or window 10 and, as shown in step 105 in FIG. 9B, the adhesive-backed wall or window graphic 20 is preferably squeegeed to the wall or window 10 in an area of the center strip of the adhesive 34.

As shown as step 106, an adjacent side removable liner strip 46 to the center strip 44 of the adhesive on the one of the left or right side of the adhesive back wall or window graphic 20, in this exemplary embodiment the left side, is then removed to expose an adjacent strip of the adhesive 34. The adhesive-backed wall or window graphic 20 is then preferably squeegeed to the wall or window in an area of the adjacent strip of the adhesive 34. Here the squeegeeing is preferably carried out using a felt squeegee. These are commercially available and known for other applications. However, other types of squeegees known in the art can be used. A next adjacent one of the side removable liner strips 46 to the center strip of the adhesive on the one of the left or right side of the adhesive-backed wall or window graphic 20 is then removed exposing a next adjacent strip of the adhesive 34, and the adhesive-backed wall or window graphic 20 in the area of the next adjacent strip of the adhesive 34 is preferably squeegeed to the window. These steps are repeated by continuing to remove the next-adjacent side removable liner strips 46 on the one of the left or right side of the adhesive-backed wall or window graphic 20 until all the removable liner strips 46 on that side of the adhesive-backed wall or window graphic 20 are removed, the successive exposed areas squeegeed in place removing air bubbles and wrinkles, and that side of the adhesive-backed wall or window graphic 20 is completely installed on the wall or window 10.

At this point, as shown at step 107, the other of the left or right side of the adhesive-backed wall or window graphic 20, in this exemplary embodiment, the right side, is bent back away from the wall or window to access the side removable liner strips 46 on this other side. While this is illustrated in FIG. 9B at step 107 as the right side, the order could be reversed. An adjacent removable liner strip 46 to the center strip of the adhesive 34 on this other of the left or right side of the adhesive-backed wall or window graphic 20 is removed to expose an other side adjacent strip of the adhesive 34. The adhesive-backed wall or window graphic 20 is preferably squeegeed to the window in an area of the other side adjacent strip of the adhesive 34. Then, a next adjacent one of the side removable liner strips 46 to the center strip of the adhesive 34 on the other of the left or right side of the adhesive-backed wall or window graphic 20 is removed to expose a next adjacent other side strip of the adhesive 34. The adhesive-backed wall or window graphic 20 is then preferably squeegeed to the window in the area of the next adjacent other side strip of the adhesive 34. These steps are repeated as indicated at 107 in FIG. 9B until all of the side removable liner strips 46 on the other of the left or right side of the adhesive-backed wall or window graphic 20 are removed, the successive exposed areas preferably squeegeed in place removing air bubbles and wrinkles, and the complete adhesive-backed window graphic 20 is installed on the window.

Preferably, the squeegeeing at each step includes pushing air bubbles and creases out to the edges of the exposed adhesive 34 after each of the liner strips 44, 46 are removed. This is enhanced by the air escape paths defined in the adhesive 34.

As noted at step 108 in FIG. 9B, bubbles and wrinkles or creases can be removed by peeling back the last adhered section of the adhesive-backed window graphic 20 off the window 10 and then re-applying and preferably re-squeegeeing that area. This can be repeated after any of the above-noted steps.

Preferably, as shown in FIG. 3, in order to allow for easier installation by any installer, the removable liner dots 42, the center removable liner strip 44, and the plurality of side removable liner strips 46 include indicia that indicate the order for removal that can be easily followed by the installer allowing for a professional looking complete installation of the adhesive-backed wall or window graphic 20.

Figure 2:
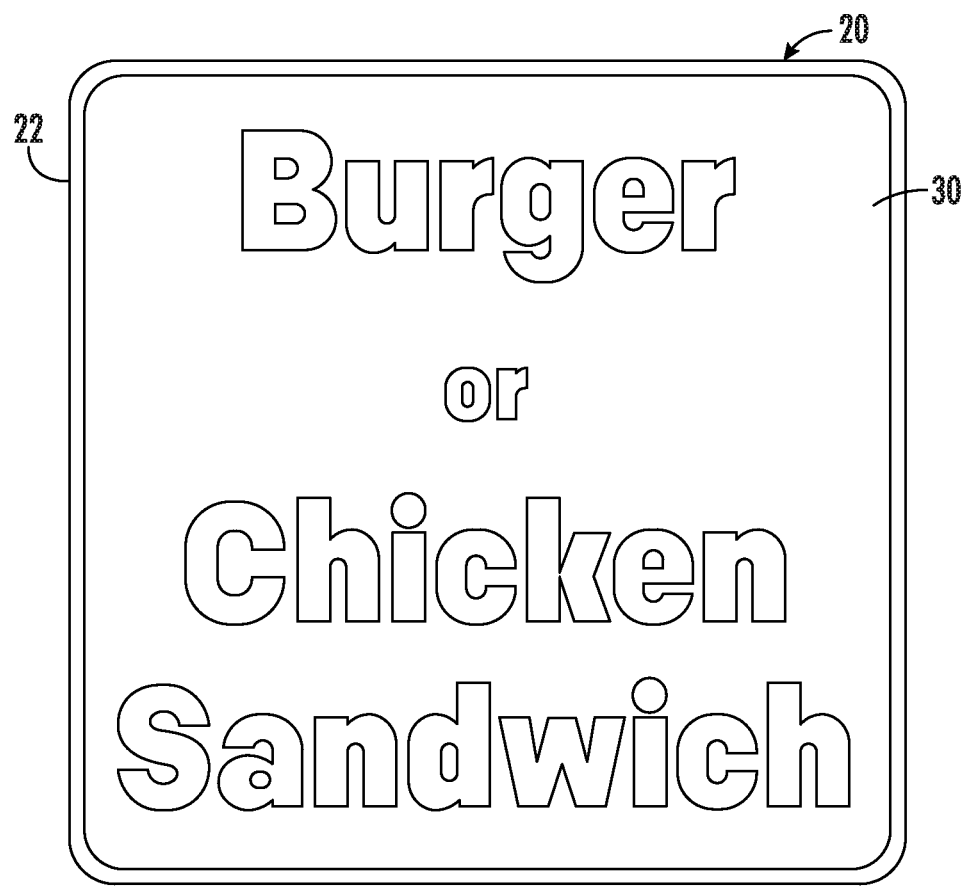
FIG. 2 is a front view of an adhesive-backed wall or window graphic in accordance with one embodiment.

While the disclosed embodiment of the adhesive-backed wall or window graphic 20 shown in FIGS. 2 and 3 is generally rectilinear, as shown in FIG. 1, various different shapes can be used in accordance with the invention.

Further, while the center removable liner strip 44 is required to be oriented generally vertically, the side removable liner strips 46 could be oriented differently than the vertical arrangement shown as long as a tiled, step-wise removal of the liner strips is possible in order to allow for a controlled adherence and squeegeeing of portions of the adhesive-backed wall or window graphic 20 to the wall or window 10 in a step-wise fashion.

Figure 10:
FIG. 10 is a front view of an adhesive-backed floor graphic in accordance with a further embodiment.

Referring to FIG. 10, an adhesive-backed floor graphic 120 (also referred to as a decal) is shown that is adapted to be installed on a floor.

Figure 11:
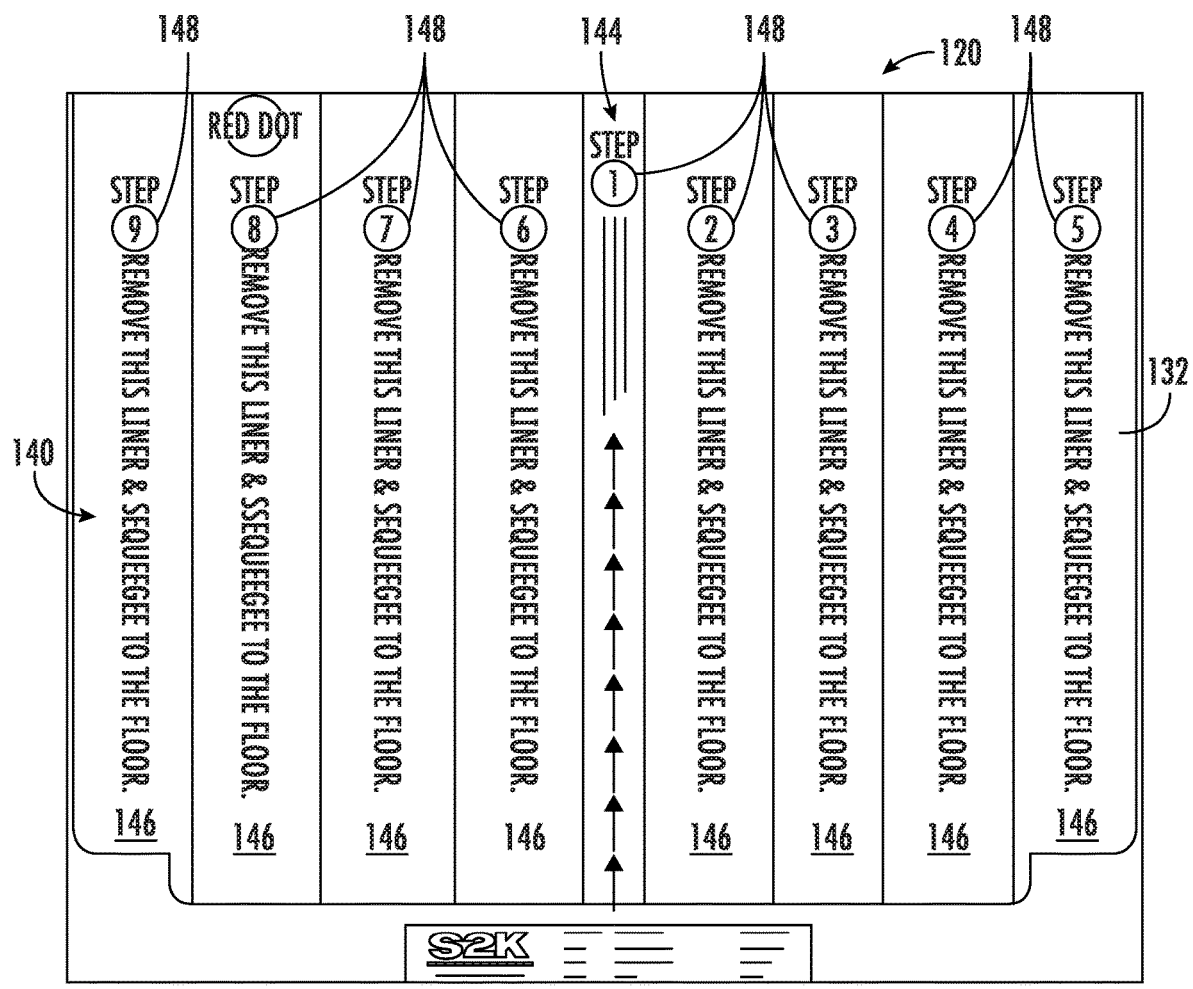
FIG. 11 is a rear view of the adhesive-backed floor graphic shown in FIG. 10.

As shown in FIGS. 10 and 11, the adhesive-backed floor graphic 120 is formed from a printed flexible substrate 122 that includes a front 130 and a back 132. The printed flexible substrate 122 is preferably made of a polymeric material, and more preferably is made of vinyl. The printed flexible substrate 122 is a solid sheet 124 which has graphics printed thereon. Optionally, a laminate (not shown) can be located on top of the solid sheet 124, similar to the laminate 26 discussed above. The overall thickness of the substrate 122 is preferably in the range of 4-25 mils, more preferably in the range of 6-15 mils.

An adhesive is located on the back of the printed flexible substrate 122, similar to the adhesive 34 discussed above. The adhesive preferably includes air escape paths defined therein which can be provided in a known manner, such as providing the adhesive as a matrix of dots with air escape paths therebetween or by providing channels through the adhesive. Adhesives and their application in this manner on adhesive-backed wall or window graphics are known to those skilled in the art and accordingly are not described in further detail here.

A back liner system 140, shown in FIG. 11, is placed on the adhesive that is adapted to be removed in order to install the adhesive-backed floor graphic 120 on a floor. The liner system 140 includes a center removable liner strip 144. This does not need to be exactly centered and can vary in position from side to side by up to 25% of a width of the adhesive-backed floor graphic 120 and still be considered centered in accordance with the present invention. Preferably, the center removable liner strip 144 has a width of no more than 2.5 inches and more preferably between 1 and 2 inches.

A plurality of side removable liner strips 146 are located on both sides of the center removable liner strip 144. The side removable liner strips 146 are preferably oriented parallel to one another. The center removable liner strip 144 and the plurality of side removable liner strips 146 preferably include indicia 148 indicating an order for removal. This can be numbers corresponding to the number removal steps as shown in FIG. 11, letters, or other indicia providing instructions on an order for removal, preferably in sequential order as shown. However, it is also possible for the instructions to provide for the initial removal of the center removable liner strip 144 followed by the removal, in alternating sequence from side to side on both sides center of the plurality of side removable liner strips 146.

This structuring of the removable liner system 140 with the center removable liner strip 144 and the plurality of side removable liner strips 146 allows for easier installation of the adhesive-backed floor graphic by the user without the requirement of having a professional installer typically needed for large format adhesive-backed wall or window graphics known in the art.

The preferred installation method is similar to that described above in connection with FIGS. 9A and 9B, except that the removable liner dots used for positioning of an adhesive-backed wall or window graphic 20 are not used, so steps 104-108 in FIGS. 9A and 9B would generally apply once the adhesive-backed floor graphic 120 has been positioned, with the use of a squeegee being optional.

Having thus described in detail a preferred embodiment of the present invention, it is to be appreciated and will be apparent to those skilled in the art that many physical changes could be made in the adhesive-backed window graphic and installation method without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

What is claimed is:

1. An adhesive-backed floor, wall, or window graphic adapted for installation on a respective one of a floor, wall, or window, the adhesive-backed floor, wall, or window graphic comprising:
    a printed flexible substrate;
    an adhesive located on a back of the printed flexible substrate; and
    a back liner system, including
        a center removable liner strip that is oriented vertically in an installation orientation of the adhesive-backed floor, wall, or window graphic,
        a plurality of side removable liner strips located on each side of the center removable liner strip, and
        the center removable liner strip and the plurality of side removable liner strips include indicia indicating an order for removal.

2. The adhesive-backed graphic of claim 1, wherein the printed flexible substrate is a solid sheet.

3. The adhesive-backed graphic of claim 1, wherein the printed flexible substrate is made of a polymeric material.

4. The adhesive-backed graphic of claim 1, further comprising a laminate located on a front surface of the printed flexible substrate.

5. The adhesive-backed graphic of claim 1, wherein an overall thickness of the substrate is 4 to 25 mils.

6. The adhesive-backed window graphic of claim 1, wherein the adhesive includes air escape paths defined therein.

7. The adhesive-backed graphic of claim 1, wherein the center removable liner strip has a width of 2.5 inches or less.

8. An adhesive-backed wall or window graphic adapted for installation on a respective one of a wall or a window, the adhesive-backed wall or window graphic comprising:
    a printed flexible substrate;
    an adhesive located on a back of the printed flexible substrate; and
    a back liner system, including
        a center removable liner strip that is oriented vertically in an installation orientation of the adhesive-backed window graphic,
        a plurality of side removable liner strips located on both sides of the center removable liner strip, and
        removable liner dots at least in two upper corners of the adhesive-backed wall or window graphic.

9. The adhesive-backed wall or window graphic of claim 8, wherein the printed flexible substrate is a mesh.

10. The adhesive-backed wall or window graphic of claim 9, further comprising additional removable liner dots located at least in lower two corners of the adhesive-backed wall or window graphic.

11. The adhesive-backed wall or window graphic of claim 8, wherein the removable liner dots, the center removable liner strip, and the plurality of side removable liner strips include indicia indicating an order for removal.

12. The adhesive-backed wall or window graphic of claim 8, further comprising an additional removable liner dots in a medial location of the adhesive-backed wall or window graphic.

* * * * *